United States Patent [19]
Yasuda

[11] Patent Number: 5,530,261
[45] Date of Patent: Jun. 25, 1996

[54] METHOD AND APPARATUS FOR DETECTING RESIDUAL NOISE ENERGY LEVELS ON STIMULABLE PHOSPHOR SHEETS

[75] Inventor: Hiroaki Yasuda, Kanagawa-ken, Japan

[73] Assignee: Fuji Photo Film Co., Ltd., Kanagawa, Japan

[21] Appl. No.: 364,266

[22] Filed: Dec. 27, 1994

[30]  Foreign Application Priority Data

Dec. 27, 1993  [JP]  Japan .................................... 5-331458

[51] Int. Cl.⁶ ................................................. G03B 42/02
[52] U.S. Cl. ............................................................. 250/588
[58] Field of Search .................................. 250/588, 590, 250/589

[56]  References Cited

U.S. PATENT DOCUMENTS 4,584,482  4/1986  Suzuki et al. .
4,786,808  11/1988  Saito ....................................... 250/588
5,028,785  7/1991  Kimura ............................... 250/588 X
5,072,119  12/1991  Yamaguchi .............................. 250/588

Primary Examiner—Carolyn E. Fields
Assistant Examiner—Edward J. Glick
Attorney, Agent, or Firm—Sughrue, Mion, Zinn, Macpeak & Seas

[57]  ABSTRACT

In a method for detecting an energy level of residual noise on a stimulable phosphor sheet, a stimulable phosphor sheet, on which a radiation image has been stored, is exposed to stimulating rays, which cause it to emit light in proportion to the amount of energy stored thereon during its exposure to radiation. The emitted light is detected, and the radiation image is thereby read out. A predetermined amount of erasing energy is given to the stimulable phosphor sheet, from which the radiation image has been read out, and noise having an energy level not higher than a predetermined energy level, which noise is among noise due to radiation image information remaining on the stimulable phosphor sheet, is thereby erased. Residual noise is then read out from the stimulable phosphor sheet, on which the noise having the energy level not higher than the predetermined energy level has been erased. An energy level of the residual noise, which has thus been read out, is then detected.

9 Claims, 4 Drawing Sheets

1

METHOD AND APPARATUS FOR DETECTING RESIDUAL NOISE ENERGY LEVELS ON STIMULABLE PHOSPHOR SHEETS

BACKGROUND OF THE INVENTION

1. Field of the Invention

This invention relates to a method and apparatus for detecting an energy level of residual noise on a stimulable phosphor sheet. This invention particularly relates to a method and apparatus for accurately detecting residual noise having a high energy level on a stimulable phosphor sheet in a radiation image read-out method and apparatus. This invention also relates to a method and apparatus for erasing residual noise, wherein the method and apparatus for detecting an energy level of residual noise on a stimulable phosphor sheet are utilized.

2. Description of the Prior Art

It has been proposed to use stimulable phosphors in radiation image recording and read-out systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. Radiation image recording and reproducing systems have also been proposed which comprise the radiation image recording and read-out systems and radiation image reproducing systems for reproducing the radiation image of the object as a visible image on a recording material from the obtained image signal.

In the radiation image recording and read-out systems or the radiation image recording and reproducing systems described above (hereinbelow be referred to as the "radiation image recording and read-out systems, or the like"), energy stored on the stimulable phosphor sheet during its exposure to radiation is not completely released therefrom during the radiation image read-out operation. Therefore, after the radiation image has been read out from the stimulable phosphor sheet, energy remains on the stimulable phosphor sheet. The remaining energy is due to the radiation image stored on the stimulable phosphor sheet. If the remaining energy on the stimulable phosphor sheet is of a level which is not negligible, when a next radiation image is recorded on the stimulable phosphor sheet and reproduced, the remaining energy will be reproduced together with the radiation image and will cause noise to occur in the reproduced visible image. Therefore, after the radiation image has been read out from the stimulable phosphor sheet, energy (hereinbelow referred to as "noise") remaining on the stimulable phosphor sheet should be erased. In order for noise to be erased, the remaining energy may be released from the stimulable phosphor sheet. For this purpose, for example, the stimulable phosphor sheet may be exposed to the ordinary environmental light for a long time and may thereby be caused to release the remaining energy. Alternatively, the stimulable phosphor sheet may be exposed to erasing light, such as visible light, having a high intensity, and the remaining energy may thus be released quickly from the stimulable phosphor sheet. In this manner, erasing energy is given to the stimulable phosphor sheet in order to erase noise such that the stimulable phosphor sheet can then be reused for the image recording operation.

In the aforesaid radiation image recording and read-out systems, or the like, as disclosed in, for example, U.S. Pat. No. 4,584,482, the light emitted by a stimulable phosphor sheet and carrying the radiation image information stored thereon is detected, and the radiation image information is thus read out. The dose of radiation delivered to the stimulable phosphor sheet is then calculated from the read-out radiation image information. Also, the amount of energy of noise remaining on the stimulable phosphor sheet after being exposed to the stimulating rays is calculated from the calculated dose of radiation delivered to the stimulable phosphor sheet, and the amount of erasing energy required to erase noise is then calculated. Thereafter, an erasing operation is carried out by irradiating erasing light having a predetermined intensity to the stimulable phosphor sheet for a time corresponding to the amount of erasing energy. For this purpose, the radiation image recording and read-out systems, or the like, are provided with an erasing section, which calculates the amount of erasing energy from the image information having been read out for the reproduction of a radiation image and carries out a noise erasing operation by delivering the calculated amount of erasing energy to the stimulable phosphor sheet.

In the conventional radiation image recording and read-out systems, or the like, when the dose of radiation delivered to the stimulable phosphor sheet is as large as 100 mR or more, particularly 300 mR or more, problems occur due to a saturation phenomenon of the photo detecting surface of the photoelectric conversion means, such as a photomultiplier. This means photoelectrically converts the light emitted by the stimulable phosphor sheet into an electric image signal. Also, ordinarily, the dynamic range of logarithmic conversion, which is carried out after the photoelectric conversion, is limited to approximately 5 orders of ten ($10^5$). Therefore, it is not always possible to make accurate calculations of a wide range of radiation from a small dose to a large dose, and there is the risk that the linearity of the photoelectric conversion becomes low. As a result, the amount of erasing energy required to erase noise cannot be calculated accurately.

SUMMARY OF THE INVENTION

The primary object of the present invention is to provide a method for detecting an energy level of residual noise on a stimulable phosphor sheet, wherein the energy level of noise remaining on the stimulable phosphor sheet after a radiation image has been read out from the stimulable phosphor sheet is detected accurately.

Another object of the present invention is to provide an apparatus for carrying out the method for detecting an energy level of residual noise on a stimulable phosphor sheet.

A further object of the present invention is to provide a method for erasing residual noise on a stimulable phosphor sheet, wherein the method for detecting an energy level of residual noise on a stimulable phosphor sheet is utilized.

A still further object of the present invention is to provide an apparatus for carrying out the method for erasing residual noise on a stimulable phosphor sheet.

The method and apparatus for detecting an energy level of residual noise on a stimulable phosphor sheet in accordance with the present invention are characterized by giving a predetermined amount of erasing energy to a stimulable phosphor sheet during an erasing operation, which is carried out after a radiation image has been read out from the stimulable phosphor sheet, thereby erasing noise having an energy level not higher than a predetermined energy level, which noise remains on the stimulable phosphor sheet, such that the energy level of noise may become low as a whole, and thereafter detecting residual noise. Therefore, the dynamic range required for the detection need not be widened, and the energy level of residual noise can be detected accurately. Also, the amount of erasing energy necessary for erasing noise can be calculated accurately from the detected energy level of residual noise.

Specifically, the present invention provides a method for detecting an energy level of residual noise on a stimulable phosphor sheet, comprising the steps of:

i) exposing a stimulable phosphor sheet, on which a radiation image has been stored, to stimulating rays, which cause the stimulable phosphor sheet to emit light in proportion to the amount of energy stored thereon during its exposure to radiation, the emitted light being detected, whereby the radiation image is read out.

ii) giving a predetermined amount of erasing energy to the stimulable phosphor sheet, from which the radiation image has been read out, whereby noise having an energy level not higher than a predetermined energy level, which noise is among noise due to radiation image information remaining on the stimulable phosphor sheet, is erased, iii) reading out residual noise from the stimulable phosphor sheet, on which the noise having the energy level not higher than the predetermined energy level has been erased, and iv) detecting an energy level of the residual noise, which has thus been read out.

The present invention also provides a method for erasing residual noise on a stimulable phosphor sheet, wherein a necessary re-erasing operation is carried out in accordance with the energy level of residual noise, which has been detected with the method for detecting an energy level of residual noise on a stimulable phosphor sheet in accordance with the present invention. The term "carrying out a necessary re-erasing operation" as used herein embraces the case where no re-erasing operation is carried out when unnecessary.

The present invention further provides an apparatus for detecting an energy level of residual noise on a stimulable phosphor sheet, comprising:

i) a first read-out means for exposing a stimulable phosphor sheet, on which a radiation image has been stored, to stimulating rays, which cause the stimulable phosphor sheet to emit light in proportion to the amount of energy stored thereon during its exposure to radiation, detecting the emitted light, and thereby reading out the radiation image, ii) a first erasing means for giving a predetermined amount of erasing energy to the stimulable phosphor sheet, from which the radiation image has been read out, and thereby erasing noise having an energy level not higher than a predetermined energy level, which noise is among noise due to radiation image information remaining on the stimulable phosphor sheet, iii) a second read-out means for reading out residual noise from the stimulable phosphor sheet, on which the noise having the energy level not higher than the predetermined energy level has been erased by the first erasing means, and iv) a detection means for detecting an energy level of the residual noise, which has been read out by the second read-out means.

The present invention still further provides an apparatus for erasing residual noise on a stimulable phosphor sheet, comprising the apparatus for detecting an energy level of residual noise on a stimulable phosphor sheet in accordance with the present invention and a second erasing means for carrying out a necessary re-erasing operation in accordance with the energy level of residual noise, which has been detected by the detection means.

The first read-out means may also serve as the second read-out means. Further, the first erasing means may also serve as the second erasing means.

So that the erasing energy can be utilized efficiently, the second erasing means should preferably be provided with an erasing energy control means for controlling the amount of erasing energy in accordance with the energy level of residual noise on the stimulable phosphor sheet.

The method and apparatus for detecting an energy level of residual noise on a stimulable phosphor sheet in accordance with the present invention and the method and apparatus for erasing residual noise on a stimulable phosphor sheet in accordance with the present invention are applicable to the radiation image recording and read-out systems described above, the radiation image recording and reproducing systems described above, and radiation image read-out methods and apparatuses for reading a radiation image from a stimulable phosphor sheet, on which the radiation image has been recorded with an independent radiation image recording apparatus.

With the method and apparatus for detecting an energy level of residual noise on a stimulable phosphor sheet in accordance with the present invention, during the first erasing operation which is carried out after the radiation image read-out operation has been carried out, a predetermined amount of erasing energy is given to the stimulable phosphor sheet, and noise having an energy level not higher than a predetermined energy level, e.g. noise having an energy level falling within a read-out dynamic range of approximately 5 orders of ten, is thereby erased. Also, with the first erasing operation, the energy level of noise having a high energy level beyond the dynamic range is reduced by an extent ranging from approximately 3 to 4 orders of ten. Therefore, the energy level of noise having the reduced energy level can be detected with the dynamic range of approximately 5 orders of ten, in which the linearity of the photoelectric conversion can be kept high. Accordingly, noise can be detected accurately.

In cases where it is found from the accurate detection that noise has been erased to an extent such that the stimulable phosphor sheet can be reused for the recording of a radiation image, the stimulable phosphor sheet may be reused directly for the recording of a radiation image. In cases where it is found from the accurate detection that noise has not been erased to an extent, which renders the stimulable phosphor sheet not reusable for the recording of a radiation image, an erasing operation may be carried out in order to erase noise to an extent, which renders the stimulable phosphor sheet reusable for the recording of a radiation image. For this purpose, for example, the stimulable phosphor sheet may be left to stand in an environment exposed to visible light.

With the method and apparatus for erasing residual noise on a stimulable phosphor sheet in accordance with the present invention, noise still remaining on the stimulable phosphor sheet is erased in accordance with the energy level of noise, which has been detected with the method and apparatus for detecting an energy level of residual noise on a stimulable phosphor sheet in accordance with the present invention. In this manner, the noise erasing operation can be carried out with an amount of erasing energy appropriate for each of stimulable phosphor sheets, which were exposed to different doses of radiation.

In cases where the apparatus for detecting an energy level of residual noise on a stimulable phosphor sheet in accordance with the present invention and the apparatus for erasing residual noise on a stimulable phosphor sheet in accordance with the present invention are constituted such that the first read-out means may also serve as the second read-out means, the number of constituent elements can be kept small, and the cost can be kept low. The same effects can be obtained when the first erasing means also serves as the second erasing means.

DESCRIPTION OF THE PREFERRED EMBODIMENTS

The present invention will hereinbelow be described in further detail with reference to the accompanying drawings.

Figure 1:
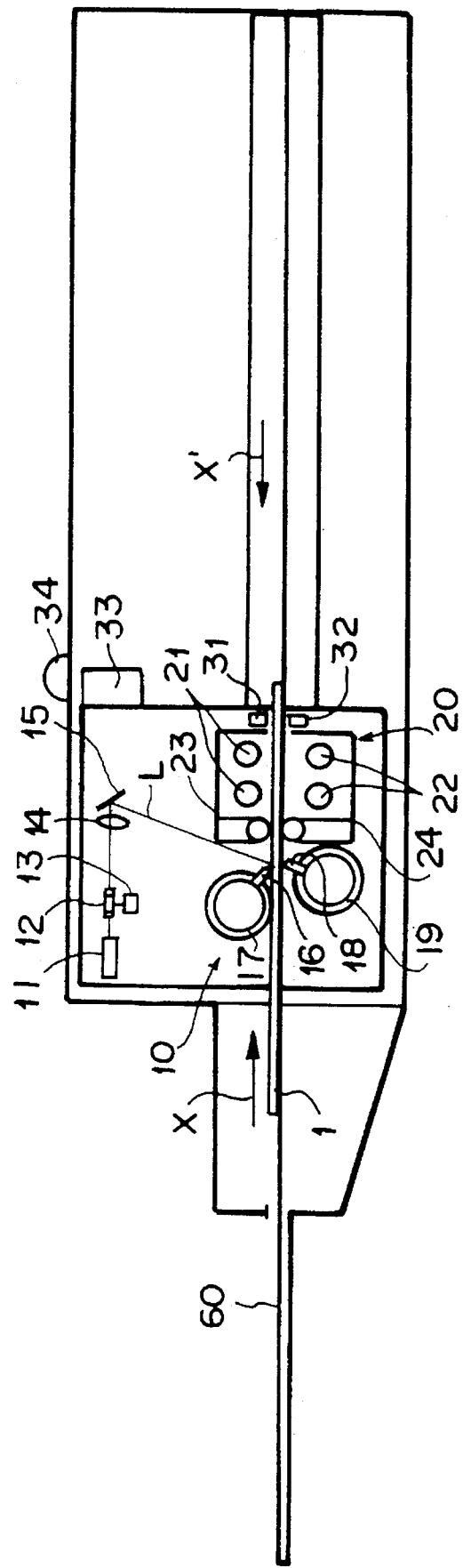
FIG. 1 is a schematic view showing an example of a radiation image read-out apparatus, wherein an embodiment of the apparatus for detecting an energy level of residual noise on a stimulable phosphor sheet in accordance with the present invention is employed.

FIG. 1 is a schematic view showing an example of a radiation image read-out apparatus, wherein an embodiment of the apparatus for detecting an energy level of residual noise on a stimulable phosphor sheet in accordance with the present invention is employed. The illustrated radiation image read-out apparatus comprises a conveyance means 60, on which a stimulable phosphor sheet 1 having a radiation image stored thereon is placed and which can move in the direction indicated by the arrow X and in the direction indicated by the arrow X'. The radiation image read-out apparatus also comprises a radiation image read-out section 10, which is located on a passage of the conveyance means 60, and an erasing section 20. In the erasing section 20, erasing light is irradiated to the stimulable phosphor sheet 1, from which the radiation image has been read out in the radiation image read-out section 10, and noise having an energy level not higher than a predetermined energy level is thereby erased from the stimulable phosphor sheet 1. The radiation image read-out apparatus further comprises noise signal read-out means 31 and 32 for reading out residual noise signals from the stimulable phosphor sheet 1, on which noise has been erased to some extent in the erasing section 20. The radiation image read-out apparatus still further comprises a residual noise energy level detecting means 33 for calculating the energy level of the residual noise from the residual noise signals, which have been read out by the noise signal read-out means 31 and 32, and an alarm indicator 34 for indicating an alarm in accordance with the calculated energy level of the residual noise.

Figure 3:
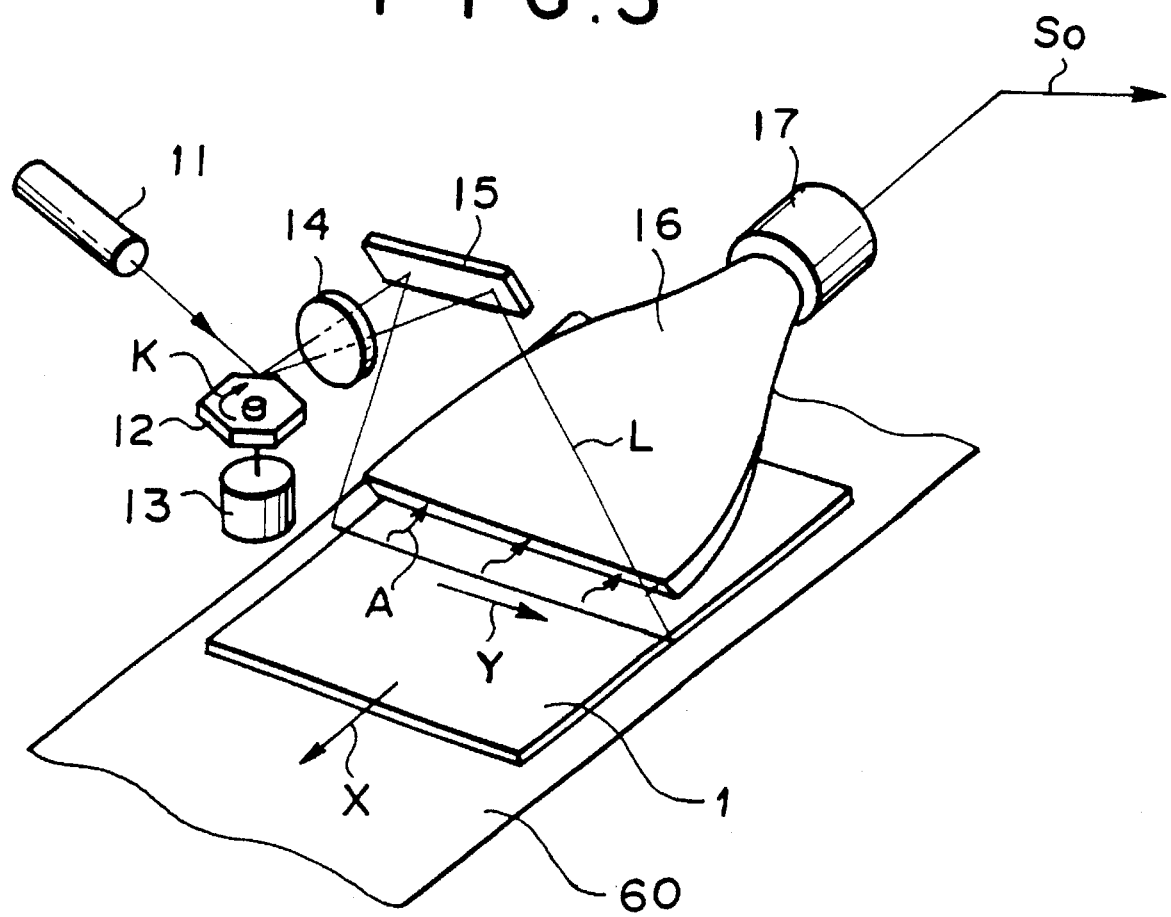
FIG. 3 is a perspective view showing a detailed configuration of a radiation image read-out section.

As illustrated in detail in FIG. 3, the radiation image read-out section 10 is provided with a stimulating ray irradiating means and a radiation image read-out system. The stimulating ray irradiating means comprises a laser beam source 11, which produces a laser beam L having a predetermined wavelength and serving as stimulating rays, and a rotating polygon mirror 12 for reflecting and deflecting the laser beam L, which has been produced by the laser beam source 11. The stimulating ray irradiating means also comprises a motor 13 for rotating the rotating polygon mirror 12, an fθ lens 14 for condensing the laser beam L, and a reflecting optical system 15 for reflecting the condensed laser beam L and changing the direction of the optical path of the laser beam L. When the stimulable phosphor sheet 1 is exposed to the laser beam L, the exposed portion of the stimulable phosphor sheet 1 emits light A in proportion to the amount of energy stored thereon during its exposure to radiation. The radiation image read-out system comprises image read-out means, such as light guide members 16 and 18 for guiding the emitted light A, and photomultipliers 17 and 19, which amplify the emitted light A guided by the light guide members 16 and 18 and photoelectrically convert the emitted light A. The light guide member 16 and the photomultiplier 17 are located on the side of the surface of the stimulable phosphor sheet 1, upon which the laser beam L impinges. The light guide member 18 and the photomultiplier 19 are located on the side opposite to the side of the surface of the stimulable phosphor sheet 1, upon which the laser beam L impinges.

The erasing section 20 comprises erasing light sources 21 and 22, which irradiate erasing light having a predetermined intensity for a predetermined time to the opposite surfaces of the stimulable phosphor sheet 1. Partition walls 23 and 24 prevent the erasing light from entering into the radiation image read-out section 10.

The noise signal read-out means 31 and 32 are array-like read-out means and read out residual noise signals from the surface of the stimulable phosphor sheet 1, upon which the stimulating rays impinge, and from the opposite surface. The noise signal read-out means 31 and 32 read out the residual noise signals for a picture element density coarser than that of the image read-out operation in the radiation image read-out section 10. The residual noise energy level detecting means 33 holds the maximum value of the values of the residual noise signals, which have been read out by the noise signal read-out means 31 and 32. The residual noise energy level detecting means 33 compares the maximum value with a predetermined threshold value. When the maximum value is larger than the threshold value, the residual noise energy level detecting means 33 feeds a signal for issuing an alarm to the alarm indicator 34. When the maximum value is not larger than the threshold value, the residual noise energy level detecting means 33 does not feed the signal for issuing an alarm to the alarm indicator 34. The threshold value is set at a value in accordance with an energy level for making a judgment as to whether the residual noise on the stimulable phosphor sheet 1 is or is not of the energy level such that the stimulable phosphor sheet 1 can be reused.

How the radiation image read-out apparatus operates will be described hereinbelow.

A radiation image is stored on the stimulable phosphor sheet 1 with a radiation image recording apparatus, or the like (not shown). The stimulable phosphor sheet 1, on which the radiation image has been stored, is placed on the conveyance means 60 and conveyed in the direction indicated by the arrow X into the radiation image read-out section 10. In the radiation image read-out section 10, the laser beam L serving as the stimulating rays is produced by the laser beam source 11. The laser beam L, which has been produced by the laser beam source 11, is deflected to a predetermined direction by the rotating polygon mirror 12, which is being quickly rotated by the motor 13. The laser beam L, which has thus been deflected, is condensed by the fθ lens 14, reflected by the reflecting optical system 15, and caused to impinge upon the stimulable phosphor sheet 1. At this time, by the rotation of the rotating polygon mirror 12 in the direction indicated by the arrow K, the laser beam L is caused to scan the stimulable phosphor sheet 1 in the main scanning direction indicated by the arrow Y. At the same time, the stimulable phosphor sheet 1 is moved by the conveyance means 60 in the sub-scanning direction indicated by the arrow X. As a result, the stimulable phosphor sheet 1 is scanned with the laser beam L in two directions.

When the stimulable phosphor sheet 1 is exposed to the laser beam L, the exposed portion of the stimulable phosphor sheet 1 emits the light A in proportion to the amount of energy stored thereon during its exposure to radiation. The emitted light A is guided by the light guide members 16 and 18, which are located facing the opposite surfaces of the stimulable phosphor sheet 1. The emitted light A is then amplified and photoelectrically converted by the photomultipliers 17 and 19. In this manner, electric signals So, So are obtained from the photomultipliers 17 and 19. The dynamic range of the emitted light A, which is capable of being photoelectrically converted by the photomultipliers 17 and 19 such that the linearity of photoelectric conversion can be kept high, is ordinarily limited to approximately 5 orders of ten (e.g. the amounts of emitted light corresponding to the image information stored with the radiation doses of 0.01 to 100 mR).

The electric signals So, So, which have been obtained from the photomultipliers 17 and 19, are fed into an image signal processing means (not shown) and subjected to signal processing. Thereafter, the signal obtained from the signal processing is used for the reproduction of a visible radiation image in an image reproducing means (not shown).

After the radiation image has been read out from the stimulable phosphor sheet 1 in the manner described above, the stimulable phosphor sheet 1 is conveyed from the radiation image read-out section 10 into the erasing section 20. In the erasing section 20, the two surfaces of the stimulable phosphor sheet 1 are exposed to erasing light, which has a predetermined intensity and produced by the erasing light sources 21 and 22, for a predetermined time. In this manner, of the noise signal due to the image information stored on the stimulable phosphor sheet 1, a noise signal having an energy level not higher than a predetermined energy level is erased. The predetermined energy level is equal to the level of the image information stored with the radiation doses of 0.01 to 100 mR. Specifically, most of the ordinary radiation images fall within this energy level range. Therefore, with the erasing operation carried out in the erasing section 20, almost all of noise signals are erased, and the stimulable phosphor sheet 1 becomes reusable for the image recording operation. Also, in cases where the stimulable phosphor sheet 1 was exposed to a large dose of radiation beyond this energy level range, e.g. to a dose of 300 mR or more, the energy level of the noise signal remaining on the stimulable phosphor sheet 1, from which the radiation image has been read out, is reduced with this erasing operation by an extent ranging from approximately 3 to 4 orders of ten (i.e. reduced to a level ranging from 1/1,000 to 1/10,000).

After the noise signal having an energy level not higher than the predetermined energy level has been erased from the stimulable phosphor sheet 1, the stimulable phosphor sheet 1 is conveyed even further in the direction indicated by the arrow X. While the stimulable phosphor sheet 1 is being thus conveyed, a noise signal remaining on the stimulable phosphor sheet 1 due to exposure to a large dose of radiation is read out from the two surfaces of the stimulable phosphor sheet 1 by the noise signal read-out means 31 and 32. The energy level of the noise signal, which is read out at this time, has been reduced by the first erasing operation to a range markedly narrower than the dynamic range of 5 orders of ten, for which the image read-out operation is possible. Therefore, the noise signal can be read out accurately.

Noise signals are thus read out accurately by the noise signal read-out means 31 and 32. The residual noise energy level detecting means 33 holds the maximum value of the values of the noise signals, which have been read out by the noise signal read-out means 31 and 32. The alarm indicator 34 issues an alarm in accordance with the maximum value. The detection of the noise of a very low energy level can be made by increasing the gain of the read-out means. The rate of the increase of the gain may be of any level between 1 to about 1000.

Specifically, in cases where the energy level of the noise signal remaining on the stimulable phosphor sheet 1 has been reduced to a level (ordinarily, not higher than approximately 5 μR), which renders the stimulable phosphor sheet 1 reusable for the recording of a radiation image, no alarm is issued. In cases where the energy level of the noise signal remaining on the stimulable phosphor sheet 1 is higher than the level, which renders the stimulable phosphor sheet 1 not reusable for the recording of a radiation image, an alarm is issued in order to indicate that the stimulable phosphor sheet 1 should be erased again or should be exposed to visible light.

The stimulable phosphor sheet 1, from which the energy level of residual noise has been detected, is conveyed in the direction indicated by the arrow X out of the radiation image read-out apparatus.

As described above, with the radiation image read-out apparatus, wherein the embodiment of the apparatus for detecting an energy level of residual noise on a stimulable phosphor sheet in accordance with the present invention is employed, the energy level of noise having a high energy level beyond the dynamic range of radiation image read-out, which is ordinarily limited to approximately 5 orders of ten, can be reduced by an extent ranging from approximately 3 to 4 orders of ten. Therefore, the energy level of noise having the reduced energy level can be detected with the dynamic range of approximately 5 orders of ten, in which the linearity of the photoelectric conversion can be kept high. Accordingly, noise can be detected accurately.

In cases where it is found from the accurate detection that noise has been erased to an extent such that the stimulable phosphor sheet can be reused for the recording of a radiation image, the stimulable phosphor sheet may be reused directly for the recording of a radiation image. In cases where it is found from the accurate detection that noise has not been erased to an extent, which renders the stimulable phosphor sheet not reusable for the recording of a radiation image, an erasing operation may be carried out in order to erase noise to an extent, which subsequently renders the stimulable phosphor sheet reusable for the recording of a radiation image. For this purpose, for example, the stimulable phosphor sheet may be left to stand in an environment exposed to visible light.

The radiation image read-out apparatus described above may further be provided with a second erasing means for applying an amount of erasing energy, which is appropriate for the energy level of residual noise having been detected by the residual noise energy level detecting means 33, to the stimulable phosphor sheet 1.

Figure 2:
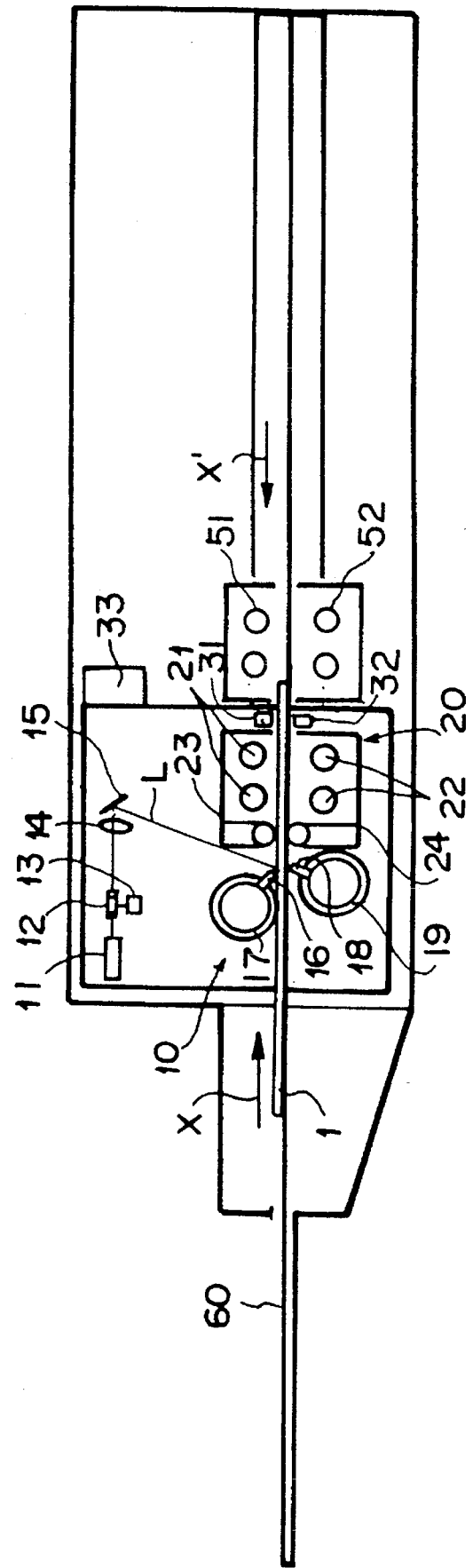
FIG. 2 is a schematic view showing the example of the radiation image read-out apparatus of FIG. 2 to which a second erasing means is added.

Specifically, as illustrated in FIG. 2, the radiation image read-out apparatus is provided with erasing light sources 51 and 52 serving as the second erasing means. The erasing light sources 51 and 52 produce erasing light having a predetermined intensity for a time corresponding to the energy level of residual noise having been detected by the residual noise energy level detecting means 33. Noise still remaining on the stimulable phosphor sheet 1 is thus erased with the erasing light produced by the erasing light sources 51 and 52. In this manner, the noise erasing operation can be carried out with an amount of erasing energy appropriate for each of stimulable phosphor sheets, which were exposed to different doses of radiation.

The radiation image read-out apparatus may be modified such that the radiation image read-out section 10 may also serve as the noise signal read-out means 31 and 32. Also, the erasing section 20 may serve as the second erasing means composed of the erasing light sources 51 and 52. In such cases, the number of constituent elements can be kept small, and the cost can be kept low.

Figure 4:
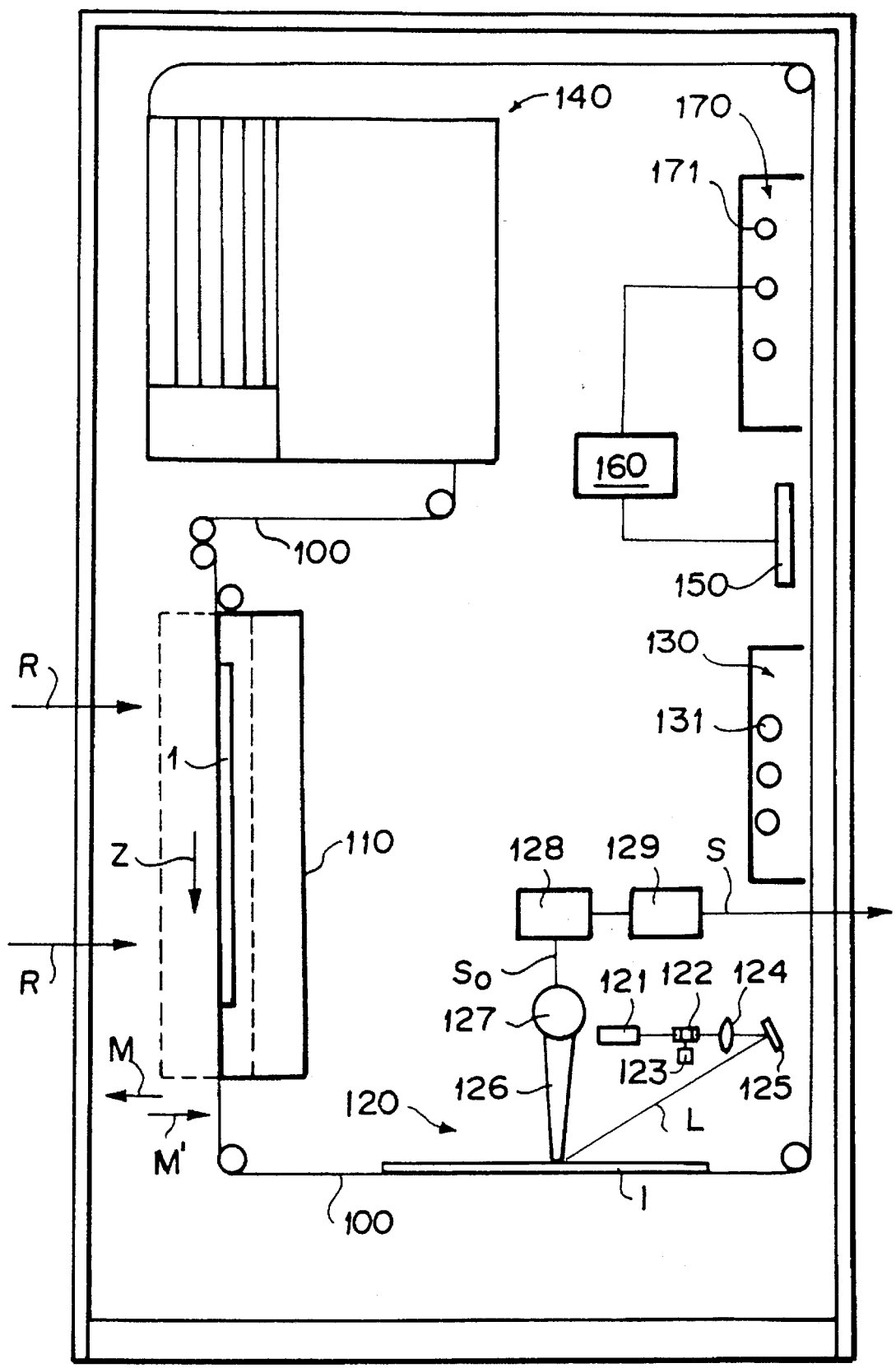
FIG. 4 is a perspective view showing an example of a radiation image recording and read-out apparatus, wherein an embodiment of the apparatus for detecting an energy level of residual noise on a stimulable phosphor sheet in accordance with the present invention is employed.

FIG. 4 is a perspective view showing an example of a radiation image recording and read-out apparatus, wherein an embodiment of the apparatus for detecting an energy level of residual noise on a stimulable phosphor sheet in accordance with the present invention is employed. The illustrated radiation image recording and read-out apparatus comprises a circulation and conveyance means 100 for conveying stimulable phosphor sheets 1, 1, . . . , which can store radiation images thereon, along a predetermined circulation path. The radiation image recording and read-out apparatus also comprises an image recording section 110, which is located on the circulation path, and in which a stimulable phosphor sheet 1 is exposed to radiation R carrying image information of an object (not shown) and is thereby caused to store a radiation image of the object thereon. The radiation image recording and read out apparatus further comprises an image read-out section 120, which is located on the circulation path and which is provided with a laser beam source 121 and a photoelectric read-out means. The laser beam source 121 produces a laser beam L serving as the stimulating rays, which is irradiated to the stimulable phosphor sheet 1 having the radiation image stored in the image recording section 110. The laser beam L causes the stimulable phosphor sheet 1 to emit light in proportion to the amount of energy stored thereon during its exposure to the radiation R. The photoelectric read-out means photoelectrically detects the emitted light and thereby obtains an image signal. The radiation image recording and read-out apparatus still further comprises a first erasing section 130, which is located on the circulation path. In the first erasing section 130, noise having an energy level not higher than a predetermined energy level, which noise is among residual noise (energy from the radiation R) on the stimulable phosphor sheet 1 after the radiation image has been read out therefrom in the image read-out section 120, is released from the stimulable phosphor sheet 1. The radiation image recording and read-out apparatus also comprises a noise signal read-out section 150 for reading out a residual noise signal from the stimulable phosphor sheet 1, on which noise has been erased to some extent in the first erasing section 130, and a control means 160 for calculating the energy level of residual noise from the read-out residual noise signal and controlling the output power of erasing light sources 171, 171, . . . of a second erasing section 170, which will be described below. The radiation image recording and read-out apparatus further comprises the second erasing section 170 provided with the erasing light sources 171, 171, . . . , the output power of which is controlled in accordance with the signal generated by the control means 160. The radiation image recording and read-out apparatus still further comprises a stock section 140 for accommodating the stimulable phosphor sheets 1, 1, . . . , which have successively passed through the first erasing section 130, the noise signal read-out section 150, and the second erasing section 170.

Specifically, as in the radiation image read-out section 10 shown in FIG. 3, the image read-out section 120 comprises the laser beam source 121, which produces the laser beam L having a predetermined wavelength and serving as stimulating rays, and a rotating polygon mirror 122 for reflecting and deflecting the laser beam L, which has been produced by the laser beam source 11. The image read-out section 120 also comprises a motor 123 for rotating the rotating polygon mirror 122, an fθ lens 124 for condensing the laser beam L, and a reflecting optical system 125 for reflecting the condensed laser beam L and causing the laser beam L to impinge upon the stimulable phosphor sheet 1. When the stimulable phosphor sheet 1 is exposed to the laser beam L, the exposed portion of the stimulable phosphor sheet 1 emits light in proportion to the amount of energy stored thereon during its exposure to radiation. The image read-out section 120 further comprises a light guide member 126 for guiding the emitted light, and a photomultiplier 127, which amplifies the emitted light guided by the light guide member 126 and photoelectrically converts the emitted light. The image read-out section 120 still further comprises a logarithmic converter 128 for logarithmically converting and amplifying an electric signal So obtained from the photomultiplier 128, and an analog-to-digital converter 129 for converting the amplified signal, which has been received from the logarithmic converter 128, into a digital signal S. The digital signal S is fed into an image reproducing apparatus (not shown).

The first erasing section 130 and the second erasing section 170 are respectively spaced a sufficient distance away from the image read-out section 120 and the noise signal read-out section 150. Therefore, the erasing light does not enter into the image read-out section 120 and the noise signal read-out section 150.

How the radiation image recording and read-out apparatus operates will be described hereinbelow.

A stimulable phosphor sheet 1 is taken out of the stocker section 140 and conveyed by the circulation and conveyance means 100 in the direction indicated by the arrow Z along the circulation path. The stimulable phosphor sheet 1 is thus located in the image recording section 110.

The image recording section 110, in which the stimulable phosphor sheet 1 has been accommodated, is moved in the direction indicated by the arrow M to the position indicated by the broken line. Thereafter, the stimulable phosphor sheet 1 is exposed to the radiation R, which has passed through an object (not shown). The radiation R carries the image information of the object. Therefore, the radiation image of the object is stored on the stimulable phosphor sheet 1. After the exposure to the radiation R is finished, the image recording section 110 is moved in the direction indicated by the arrow M' and is thus returned to its original position. The stimulable phosphor sheet 1, on which the radiation image has been stored, is then conveyed by the circulation and conveyance means 100 into the image read-out section 120.

In the image read-out section 120, as in the example of the radiation image read-out apparatus described above, the stimulable phosphor sheet 1 is scanned with the laser beam L serving as the stimulating rays, and the light is thereby emitted by the stimulable phosphor sheet 1 in proportion to the amount of energy stored thereon during its exposure to the radiation R. The emitted light is guided by the light guide member 126 and photoelectrically converted by the photomultiplier 127. The image signal So thus obtained from the photomultiplier 127 is logarithmically amplified by the logarithmic converter 128 and converted by the analog-to-digital converter 129 into the digital signal S. The digital signal S is then fed into the image reproducing apparatus (not shown) and used for the reproduction of the radiation image as a visible image.

Thereafter, the stimulable phosphor sheet 1 is conveyed by the circulation and conveyance means 100 into the first erasing section 130. In the first erasing section 130, the stimulable phosphor sheet 1 is exposed to the erasing light produced by erasing light sources 131, 131, . . . , and a noise signal having an energy level not higher than a predetermined energy level is erased from the stimulable phosphor sheet 1. As in the example of the radiation image read-out apparatus described above, the predetermined energy level is equal to the level of the image information stored with the radiation doses of 0.01 to 100 mR. Also, in cases where the stimulable phosphor sheet 1 was exposed to a large dose of radiation R beyond this energy level range, e.g. to a dose of 300 mR or more, the energy level of the noise signal remaining on the stimulable phosphor sheet 1, from which the radiation image has been read out, is reduced with this erasing operation by an extent ranging from approximately 3 to 4 orders of ten.

After the noise signal having an energy level not higher than the predetermined energy level has been erased from the stimulable phosphor sheet 1, the stimulable phosphor sheet 1 is conveyed even further by the circulation and conveyance means 100 into the noise signal read-out section 150. In the noise signal read-out section 150, a residual noise signal is read out from the stimulable phosphor sheet 1, on which the noise signal having an energy level not higher than the predetermined energy level has been erased in the first erasing section 130. The energy level of the noise signal, which is read out at this time, has been reduced by the erasing operation of the first erasing section 130 to a range markedly narrower than the dynamic range of 5 orders of ten, for which the image read-out operation is possible. Therefore, the noise signal can be read out accurately.

The noise signal is thus read out accurately by the noise signal read-out section 150. The noise signal is then fed into the control section 160. The control section 160 detects the energy level of the noise signal, calculates the amount of erasing energy, which is required to erase the noise signal having the detected energy level, and feeds out a control signal to the second erasing section 170 such that the erasing light sources 171, 171, . . . of the second erasing section 170 may produce the erasing light having an energy level corresponding to the calculated amount of erasing energy.

In cases where the energy level of the noise signal remaining on the stimulable phosphor sheet 1 has been reduced to a level, which renders the stimulable phosphor sheet 1 reusable for the recording of a radiation image, the control signal is fed out such that the erasing light sources 171, 171, . . . of the second erasing section 170 may not produce the erasing light.

The stimulable phosphor sheet 1, from which the residual noise signal has been detected, is conveyed into the second erasing section 170. In the second erasing section 170, the stimulable phosphor sheet 1 is exposed to the erasing light, which is produced by the erasing light sources 171, 171, . . . with an energy level corresponding to the control signal received from the control section 160. By the exposure to the erasing light, the noise signal remaining on the stimulable phosphor sheet 1 is erased, and the stimulable phosphor sheet 1 can then be reused for the recording of a radiation image.

The stimulable phosphor sheet 1, on which the residual noise signal has been erased to a level rendering the stimulable phosphor sheet 1 reusable for the recording of a radiation image, is conveyed by the circulation and conveyance means 100 into the stocker section 140, and is kept in the stocker section 140 for the recording of the next radiation image.

As described above, with the radiation image recording and read-out apparatus, wherein the embodiment of the apparatus for detecting an energy level of residual noise on a stimulable phosphor sheet in accordance with the present invention is employed, the energy level of noise having a high energy level beyond the dynamic range of radiation image read-out, which is ordinarily limited to approximately 5 orders of ten, can be reduced by an extent ranging from approximately 3 to 4 orders of ten. Therefore, the energy level of noise having the reduced energy level can be detected with the dynamic range of approximately 5 orders of ten, in which the linearity of the photoelectric conversion can be kept high. Accordingly, noise can be detected accurately. Also, noise remaining even further on the stimulable phosphor sheet can be erased in accordance with the energy level of residual noise. In this manner, the noise erasing operation can be carried out with an amount of erasing energy appropriate for each of stimulable phosphor sheets, which were exposed to different doses of radiation.

The radiation image recording and read-out apparatus may be modified such that the image read-out section 120 may also serve as the noise signal read-out section 130. Also, the first erasing section 130 may serve as the second erasing section 170. In such cases, the number of constituent elements can be kept small, and the cost can be kept low. Also, the size of the radiation image recording and read-out apparatus can be kept small.

What is claimed is:

1. A method for detecting and erasing all energy level of residual noise on a stimulable phosphor sheet, comprising the steps of:

i) exposing said sheet, which has undergone radiation exposure, to stimulating rays, which cause said sheet to emit light in proportion to the amount of energy stored thereon during said radiation exposure;

ii) detecting the emitted light, whereby a radiation image is read out, iii) exposing said sheet to a first erasing energy, whereby noise having an energy level not higher than a predetermined energy level is erased;

iv) reading out residual noise from said sheet, v) detecting an energy level of said residual noise, vi) erasing said residual noise from said sheet by exposing said sheet to a second erasing energy in accordance with said energy level of said residual noise.

2. A method for erasing residual noise on a stimulable phosphor sheet as defined in claim 1 wherein the stimulable phosphor sheet is scanned two-dimensionally with said stimulating rays.

3. A method for erasing residual noise on a stimulable phosphor sheet as defined in claim 1 wherein said stimulating rays comprise a laser beam.

4. An apparatus for detecting and erasing an energy level of residual noise on a stimulable phosphor sheet, comprising:

i) a first read-out means comprising a read-out circuit for exposing said sheet, which has undergone radiation exposure to stimulating rays, which cause said sheet to emit light in proportion to the amount of energy stored thereon during said radiation exposure, ii) a detecting means for detecting the emitted light and reading out a radiation image, iii) a first erasing means comprising an erasure circuit for giving a first erasing energy to said sheet for erasing noise having an energy level not higher than a predetermined energy level iv) a second read-out means comprising a read out circuit for reading out residual noise from said sheet, wherein said residual noise comprises radiation image information remaining on said sheet after processing by said first erasing means, v) a second detection means for detecting an energy level of said residual noise, which has been read out by said second read-out means; and vi) a second erasing means comprising an erasure circuit for giving a second erasing energy to said sheet in accordance with the energy level of residual noise detected by said second detection means.

5. An apparatus for erasing residual noise on a stimulable phosphor sheet according to claim 4, wherein said read out circuit of said first read-out means also serves as said read out circuit of said second read out means.

6. An apparatus for erasing residual noise on a stimulable phosphor sheet according to claim 4, wherein said first read out means two-dimensionally scans said phosphor sheet with said stimulating rays.

7. An apparatus for erasing residual noise on a stimulable phosphor sheet according to claim 4, wherein said stimulating rays comprise a laser beam.

8. An apparatus for erasing residual noise on a stimulable phosphor sheet as defined in claims 4, 5, 6, or 7 wherein said erasure circuit of said first erasing means also serves as said erasure circuit of said second erasing means.

9. An apparatus for erasing residual noise on a stimulable phosphor sheet as defined in claim 4, 5, 6, or 7 wherein said second erasing means further comprises an erasing energy control means for controlling said second erasing energy in accordance with the energy level of residual noise on the stimulable phosphor sheet.

* * * * *